(12) United States Patent
Tamano

(10) Patent No.: US 10,775,598 B2
(45) Date of Patent: Sep. 15, 2020

(54) SCANNING MICROSCOPE

(71) Applicant: OLYMPUS CORPORATION, Hachioji-shi, Tokyo (JP)

(72) Inventor: Shingo Tamano, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/167,103

(22) Filed: Oct. 22, 2018

(65) Prior Publication Data

US 2019/0056577 A1 Feb. 21, 2019

Related U.S. Application Data

(62) Division of application No. 15/230,213, filed on Aug. 5, 2016, now Pat. No. 10,107,999.

(30) Foreign Application Priority Data

Aug. 26, 2015 (JP) .................................. 2015-167266

(51) Int. Cl.
*G02B 21/00* (2006.01)
*G02B 21/02* (2006.01)
(Continued)

(52) U.S. Cl.
CPC ....... *G02B 21/006* (2013.01); *G02B 21/0024* (2013.01); *G02B 21/0036* (2013.01);
(Continued)

(58) Field of Classification Search
CPC .............. G02B 21/002; G02B 21/0024; G02B 21/0032; G02B 21/0036; G02B 21/006; G02B 21/0072; G02B 21/025
(Continued)

(56) References Cited

U.S. PATENT DOCUMENTS

| 5,790,710 A | 8/1998 | Price et al. |
| 7,002,737 B1 * | 2/2006 | Akiyama ................. G02B 3/14 359/368 |

(Continued)

FOREIGN PATENT DOCUMENTS

| JP | 2001257932 A | 9/2001 |
| JP | 2004029685 A | 1/2004 |

(Continued)

OTHER PUBLICATIONS

Notice of Allowance dated Jul. 24, 2018 issued in U.S. Appl. No. 15/230,213.
(Continued)

*Primary Examiner* — Nicholas R. Pasko
(74) *Attorney, Agent, or Firm* — Holtz, Holtz & Volek PC

(57) ABSTRACT

A scanning microscope includes a laser configured to emit laser light, an objective configured to focus the laser light on an object, a scanner configured to scan the object in a direction orthogonal to an optical axis of the objective, a varifocal lens configured to scan the object in an optical-axis direction of the objective by changing a lens shape of the varifocal lens, a first relay lens configured to project the scanner onto the varifocal lens, a second relay lens configured to project a pupil of the objective onto the varifocal lens, a photodetector configured to detect fluorescence generated from the object upon the laser light being focused on the object by the objective, and a dichroic mirror configured to separate the fluorescence and the laser light emitted from the laser from each other. The varifocal lens is located between the objective and the scanner.

6 Claims, 12 Drawing Sheets

(51) Int. Cl.
*G02B 26/10* (2006.01)
*G02B 27/00* (2006.01)
*G02B 27/14* (2006.01)

(52) U.S. Cl.
CPC ....... *G02B 21/0076* (2013.01); *G02B 21/025* (2013.01); *G02B 26/10* (2013.01); *G02B 27/0031* (2013.01); *G02B 27/141* (2013.01)

(58) Field of Classification Search
USPC .................................................. 359/379, 380
See application file for complete search history.

(56) References Cited

U.S. PATENT DOCUMENTS

| | | | |
|---|---|---|---|
| 7,130,117 | B2 | 10/2006 | Tsuyuki |
| 8,184,365 | B2 | 5/2012 | Rolland et al. |
| 8,184,367 | B2 | 5/2012 | Rolland et al. |
| 8,553,324 | B2 | 10/2013 | Pacholik et al. |
| 8,702,770 | B2 | 4/2014 | Hanft et al. |
| 8,711,473 | B2 * | 4/2014 | Hirata .................. G02B 21/002 359/379 |
| 2011/0028951 | A1 | 2/2011 | Raksi et al. |
| 2012/0002164 | A1 * | 1/2012 | Yamamoto ............. A61B 3/102 351/206 |
| 2012/0120469 | A1 | 5/2012 | Fukushima |
| 2014/0008549 | A1 * | 1/2014 | Theriault ............. G02B 26/105 250/459.1 |

FOREIGN PATENT DOCUMENTS

| | | |
|---|---|---|
| JP | 2004317704 A | 11/2004 |
| JP | 2006343596 A | 12/2006 |
| JP | 2008003576 A | 1/2008 |
| JP | 2008535012 A | 8/2008 |
| JP | 2012123385 A | 6/2012 |
| WO | 2006103290 A1 | 10/2006 |

OTHER PUBLICATIONS

Office Action (Final Rejection) dated Oct. 20, 2017 issued in U.S. Appl. No. 15/230,213.
Office Action (Non-Final Rejection) dated Feb. 22, 2018 issued in U.S. Appl. No. 15/230,213.
Office Action (Non-Final Rejection) dated May 19, 2017 issued in U.S. Appl. No. 15/230,213.
Japanese Office Action dated Jul. 23, 2019 (and English translation thereof) issued in counterpart Japanese Application No. 2015-167266.

* cited by examiner

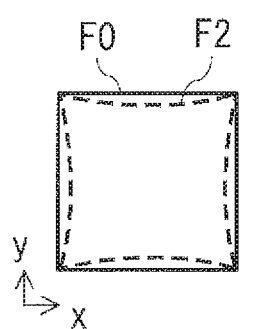
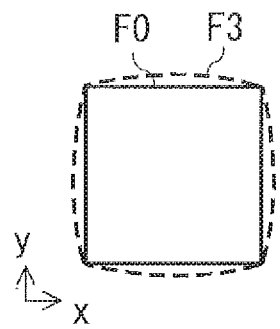
F I G. 4 A       F I G. 4 B

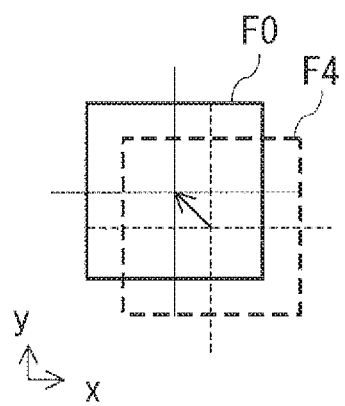
F I G. 5

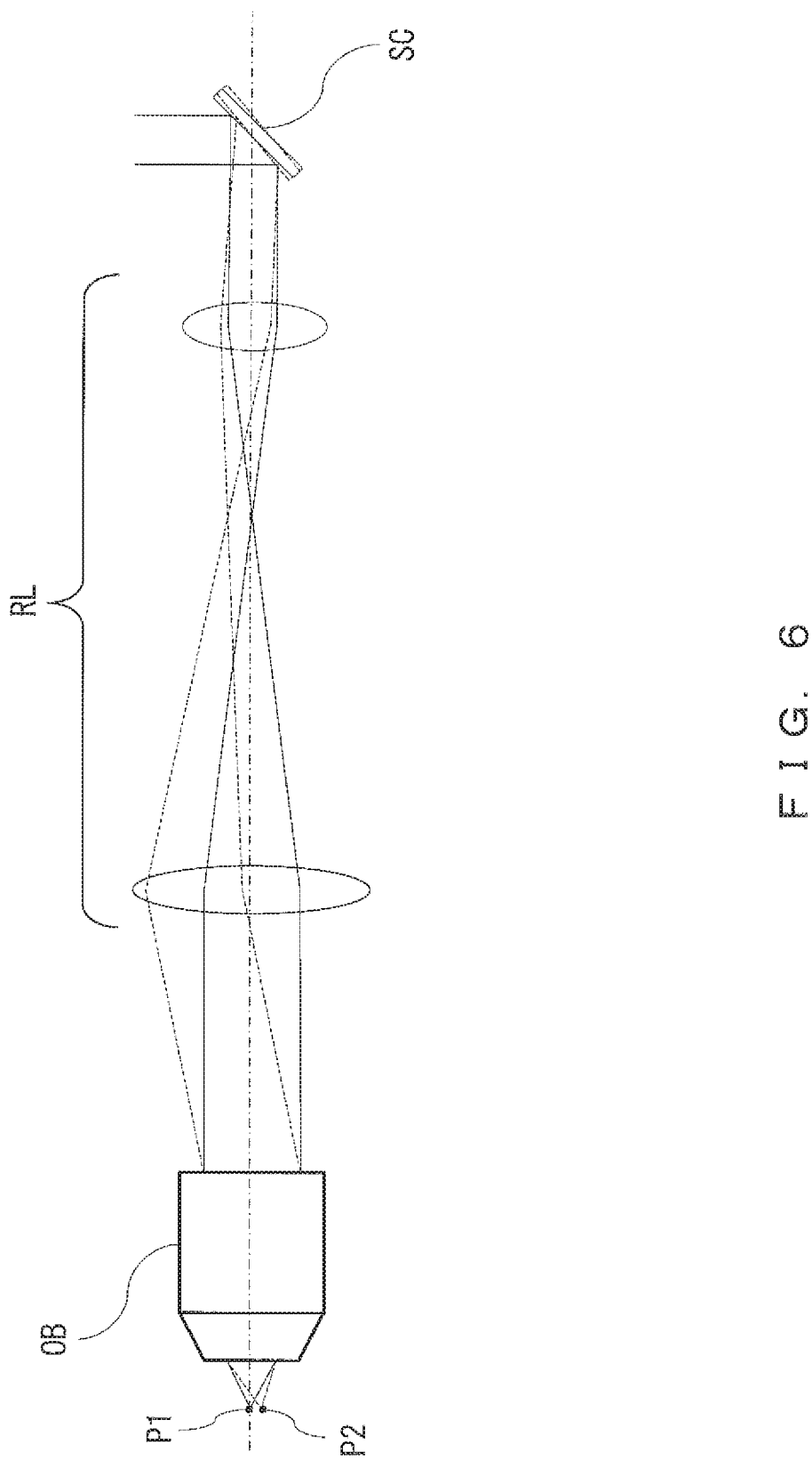
F I G. 6

SCANNING MICROSCOPE

CROSS REFERENCE TO RELATED APPLICATIONS

This application is a Divisional application of U.S. application Ser. No. 15/230,213, filed Aug. 5, 2016, which is based on and claims the benefit of priority from prior Japanese Patent Application No. 2015-167266, filed Aug. 26, 2015, the entire contents of both of which are incorporated herein by this reference.

BACKGROUND OF THE INVENTION

Field of the Invention

The present invention relates to a technology for a scanning microscope and particularly relates to a technology for a scanning microscope that includes a varifocal lens.

Description of the Related Art

Scanning microscopes such as confocal laser scanning microscopes and multiphoton-excitation laser scanning microscopes are known as apparatuses for observing a three-dimensional image of an object.

For directions orthogonal to the optical axis of an objective (x direction and y direction), a scanning microscope is capable of performing a scan at a high frequency of hundreds to thousands Hertz using a galvanometer scanner or a resonance scanner. Meanwhile, a scan in an optical-axis direction (z-axis direction) is performed by moving the objective or a stage in the optical-axis direction typically using a piezoelectric transducer (hereinafter referred to as a piezo element) and another actuator. U.S. Pat. No. 8,553,324 describes a technique for achieving a scan in an optical-axis direction by moving a tube lens in the optical-axis direction.

However, a method of mechanically moving structures such as an optical system and a stage using an actuator involves a time for the moving and a time before oscillations caused by the moving stop. Hence, it is difficult to perform a fast scan in an optical-axis direction. As a result, it takes a long time to obtain a three-dimensional image.

Japanese Laid-open Patent Publication No. 2004-317704 describes a varifocal lens as means for solving such a technical problem. Use of the varifocal lens allows a focal length to be rapidly changed by changing an applied current or voltage. This enables a fast scan in an optical-axis direction. Recently, varifocal lenses have been developed that vary a focal length more greatly than those in the prior art. Hence, usability of a varifocal lens as scan means has been enhanced.

SUMMARY OF THE INVENTION

An aspect of the present invention provides a scanning microscope that includes: a varifocal lens that scans an object in an optical-axis direction of an objective; a scanner that scans the object in a direction orthogonal to the optical axis of the objective; and a controller that controls the varifocal lens and the scanner, wherein the controller controls the scanner according to scan control data for correcting deviation of a scan position that is caused by the varifocal lens.

Another aspect of the invention provides a scanning microscope that includes: a varifocal lens that scans an object in an optical-axis direction of an objective; a scanner that scans the object in a direction orthogonal to the optical axis of the objective; and a controller that controls the varifocal lens and the scanner, wherein the controller controls the scanner so as to correct deviation of a scan position that is caused by the varifocal lens.

BRIEF DESCRIPTION OF THE DRAWINGS

The present invention will be more apparent from the following detailed description when the accompanying drawings are referenced.

FIG. 4A illustrates a method of correcting pincushion distortion;

FIG. 4B illustrates a method of correcting barrel distortion;

FIG. 5 illustrates a method of correcting a center-position deviation of a scan range;

FIG. 6 illustrates a relationship between a scanner and a scan position;

DESCRIPTION OF EMBODIMENTS

Performing a scan in an optical-axis direction using a varifocal lens changes the projection magnification of an optical system, including the varifocal lens, due to a change in the focal length of the varifocal lens, as described in Japanese Laid-open Patent Publication Nos. 2001-257932 and 2004-029685. This also changes an aberration caused by the optical system. Hence, in the prior art, it is difficult to obtain an accurate three-dimensional image of an object.

The following describes embodiments of the invention.

Embodiment 1

Figure 1:
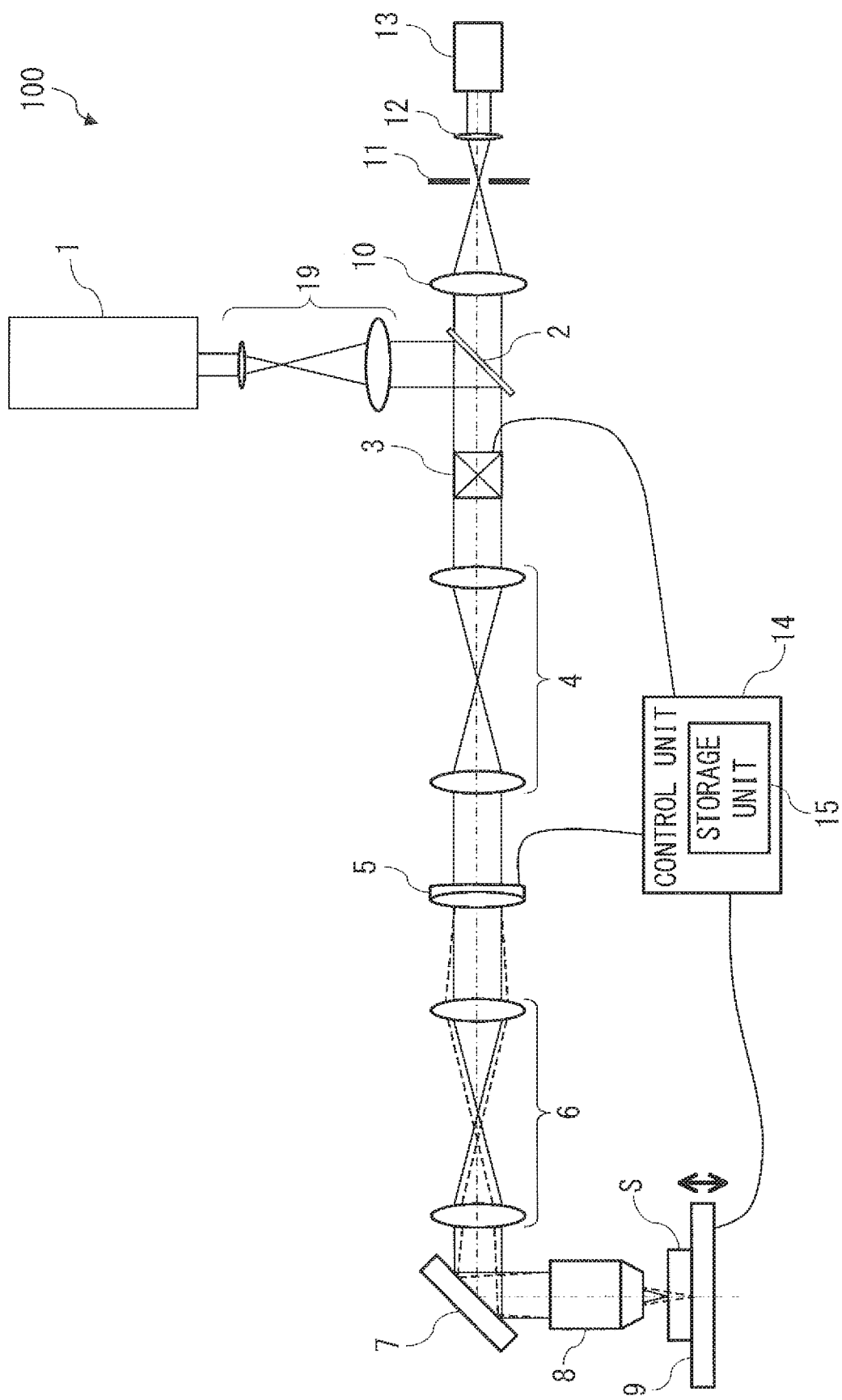
FIG. 1 illustrates the configuration of a microscope 100 in accordance with embodiment 1.

FIG. 1 illustrates the configuration of a microscope 100 in accordance with the present embodiment. The microscope 100 is a confocal laser scanning microscope. The description is based on an exemplary situation in which the microscope 100 is a fluorescence microscope that detects fluorescence from a sample S. However, the microscope 100 is not limited to a fluorescence microscope but may be, for example, an industrial confocal laser scanning microscope that detects reflected light.

The microscope 100 includes a laser 1 that emits laser light and a stage 9 on which a sample S, i.e., an object, is placed. The microscope 100 includes a beam expander 19, a dichroic mirror 2, a scanner 3, a relay lens 4, a varifocal lens 5, a relay lens 6, a mirror 7, and an objective 8, all of which are provided on a path of illumination light between the laser 1 and the stage 9. When the microscope 100 is an industrial confocal laser scanning microscope, the microscope 100 may include a polarization beam splitter, rather than the dichroic mirror 2, and may include a λ/4 plate between the polarization beam splitter and the objective. The microscope 100 may include a λ/2 plate between the polarization beam splitter and the laser 1.

The beam expander 19 is an optical system that changes the light flux diameter (beam diameter) of laser light from the laser 1 in accordance with, for example, the pupil diameter of an objective in use. Controlling the light flux diameter of laser light entering the pupil of the objective 8 using the beam expander 19 allows various aberrations that occur at the objective 8 (e.g., spherical aberrations) to be suppressed. For example, a scattering of excitation light can be suppressed in observing a portion deep within a cell.

The dichroic mirror 2 has properties of reflecting laser light and allowing passage of fluorescence. The dichroic mirror 2 is a splitter that separates entering light according to a wavelength. The scanner 3 scans a sample S in a direction orthogonal to the optical axis of the objective 8. The scanner 3 is located at, or near, a position optically conjugate to the pupil of the objective 8 (hereinafter referred to as a pupil-conjugate position). The scanner 3 includes a scanner that performs a scan in an x direction orthogonal to the optical axis of the objective 8, and a scanner that performs a scan in a y direction orthogonal to the optical axis of the objective 8 and orthogonal to the x direction. The scanners are, for example, galvanometer scanners or resonance scanners.

The relay lens 4 projects the scanner 3 onto the varifocal lens 5. The varifocal lens 5 changes the focal length thereof so as to scan the sample S in the optical axis direction of the objective 8. The varifocal lens 5 changes the focal length by, for example, changing the lens shape. The difference between light fluxes represented by dotted lines in FIG. 1 and light fluxes represented by solid lines in FIG. 1 results from a change in the focal length of the varifocal lens 5. The varifocal lens 5 is located at, or near, the pupil-conjugate position of the objective 8.

The relay lens 6 projects the pupil of the objective 8 onto the varifocal lens 5. The objective 8 is mounted on a revolver (not illustrated). In the microscope 100, a plurality of objectives, including the objective 8, are switched between in accordance with, for example, an observation magnification. The stage 9 is an electric stage moved by an actuator (not illustrated) in the optical axis direction of the objective 8.

The microscope 100 includes a photodetector 13 that detects fluorescence from a sample S. The microscope 100 further includes a lens 10, a pinhole plate 11, and a lens 12, all of which are provided on a path of detected light between the dichroic mirror 2 and the photodetector 13.

The lens 10 gathers fluorescence that has passed through the dichroic mirror 2. The pinhole plate 11 is a confocal diaphragm that has a pinhole formed at a position conjugate to a front focal position of the objective 8. The lens 12 guides, to the photodetector 13, fluorescence that has passed through the pinhole plate 11. The photodetector 13 outputs a signal that depends on the intensity of detected fluorescence, and is, for example, a Photomultiplier Tube (PMT).

The microscope 100 further includes a control unit 14 that includes a processor and a storage unit 15. The control unit 14 is a controller that controls operations of the entirety of the microscope 100. The control unit 14 controls the scanner 3, the varifocal lens 5, and the stage 9. The control unit 14 may change the oscillation angle of a mirror included in the scanner 3, the focal length of the varifocal lens 5, and the position of the stage 9 in an optical-axis direction. The control unit 14 may control the beam expander 19 and change the light flux diameter of laser light emitted from the beam expander 19. The storage unit 15 is, for example, a hard disk apparatus, a flash memory, or another memory, and stores scan control data for correcting deviation of a scan position that is caused by the varifocal lens 5. Scan control data is used to control both, or one of, the scanner 3 and the varifocal lens 5 and is stored in the storage unit 15 for each objective. Scan control data is generated using a method described hereinafter with reference to FIG. 2 and stored in the storage unit 15.

In the microscope 100 configured as described above, laser light emitted from the laser 1 is reflected at the dichroic mirror 2, and is focused onto the sample S after entering the objective 8 via the scanner 3, the relay lens 4, the varifocal lens 5, the relay lens 6, and the mirror 7. Changing the oscillation angle of the scanner 3 changes a focused-on position of the light (hereinafter referred to as a scan position) with respect to a direction orthogonal to the optical axis (xy direction), and changing the focal length of the varifocal lens 5 changes the scan position with respect to the optical-axis direction (z direction). Accordingly, the control unit 14 may control the scanner 3 and the varifocal lens 5 so as to three-dimensionally scan the sample S. The amount of a variation in the focal length of the varifocal lens 5 is limited, and hence the varifocal lens 5 performs a scan in the optical-axis direction after the sample S has come close to the focal position of the objective 8 through the movement of the stage 9.

Fluorescence is generated from the sample S irradiated with laser light and enters the dichroic mirror 2 via the objective 8, the mirror 7, the relay lens 6, the varifocal lens 5, the relay lens 4, and the scanner 3. The fluorescence passes through the dichroic mirror 2 and is focused onto the pinhole plate 11 by the lens 10. Fluorescence generated from the scan position, i.e., the position onto which the laser light has been focused, passes through the pinhole formed on the pinhole plate 11 and enters the photodetector 13 via the lens 12; the fluorescence is detected by the photodetector 13. Meanwhile, fluorescence generated from positions other than the scan position is blocked by the pinhole plate 11. Accordingly, the photodetector 13 generates a signal that depends on the intensity of the fluorescence generated from the scan position.

While the scanner 3 is performing scanning, the microscope 100 samples the output signal from the photodetector 13 so as to obtain a two-dimensional image (xy cross-sectional image) of the sample S, thereby generating xy-cross-sectional-image data. This process is performed every time a scan based on the varifocal lens 5 is performed in the optical-axis direction. The microscope 100 generates three-dimensional-image data according to a plurality of pieces of xy-cross-sectional-image data, each of which is generated in the described manner and corresponds to a different z coordinate.

In the microscope 100, the control unit 14 is configured to control the scanner 3, or both the scanner 3 and the varifocal lens 5 so as to correct, according to scan control data stored in the storage unit 15, deviation of a scan position that is caused by the varifocal lens 5. This enables, for example, a magnification error or aberration caused by the varifocal lens 5 to be suppressed so that the microscope 100 can obtain an accurate three-dimensional image. The microscope 100 scans the sample S in the optical-axis direction by changing the focal length of the varifocal lens 5. This enables a fast scan in comparison with a situation in which the objective 8 or the stage 9 is moved in the optical-axis direction. Hence, the microscope 100 can quickly obtain an accurate three-dimensional image.

Figure 2:
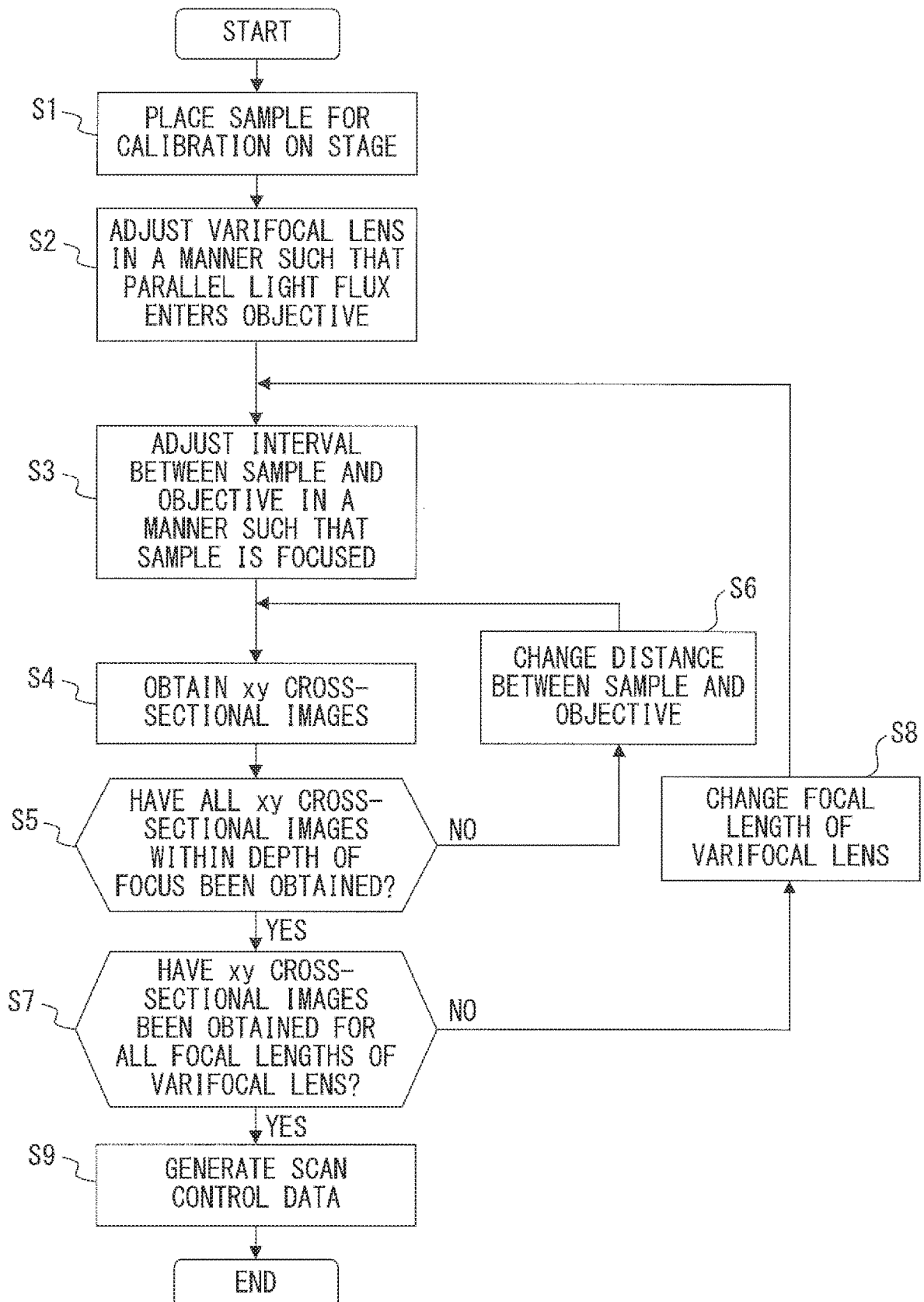
FIG. 2 is a flowchart illustrating a method of generating scan control data.

FIG. 2 is a flowchart illustrating a method of generating scan control data to be used for scan control performed by the control unit 14. The following specifically describes the method of generating scan control data with reference to FIG. 2.

A user prepares and places a sample for calibration on the stage 9 (step S1). The sample for calibration is, for example, a sample that includes a region having a known shape from which fluorescence is to be emitted.

After placing the sample for calibration on the stage 9, the user adjusts the varifocal lens 5 in a manner such that a parallel light flux enters the objective 8 (step S2). After adjusting the varifocal lens 5, the user moves the stage 9 in an optical-axis direction so as to adjust an interval between the sample and the objective 8 in a manner such that the sample is focused (step S3). In this example, the user may adjust the position of the stage 9 while using an observation apparatus (not illustrated) of the microscope 100 so as to check whether the sample S is focused.

The microscope 100 obtains an xy cross-sectional image corresponding to a plane of the sample in accordance with an instruction from the user (step S4). In this example, the control unit 14 controls the scanner 3 without using scan control data. That is, xy cross-sectional-image data is generated by the control unit 14 controlling the scanner 3, as in the case of a situation in which the varifocal lens 5 is not provided.

The microscope 100 determines whether all xy cross-sectional images within a depth of focus have been obtained (step S5). In this example, the microscope 100 determines, for example, whether all xy cross-sectional images for a region extending from the plane focused in step S3 within the depth of focus have been obtained at certain intervals.

When it is determined that not all of the images have been obtained (NO in step S5), the microscope 100 changes the distance between the sample and the objective 8 by moving the stage 9 in the optical-axis direction without deviating from the region within the depth of focus (step S6). Subsequently, the process of obtaining xy cross-sectional images (step S4) and the determining process (step S5) are performed again.

When it is determined that all of the images have been obtained (YES in step S5), the microscope 100 determines whether xy cross-sectional images have been obtained for all of the focal lengths of the varifocal lens 5 (step S7). "All of the focal lengths" means, for example, all of the focal lengths that fall within the range of variation in focal length of the varifocal lens 5, the focal lengths being obtained at certain intervals.

When it is determined that xy cross-sectional images have not been obtained for all of the focal lengths (NO in step S7), the microscope 100 changes the focal length of the varifocal lens 5 (step S8). Subsequently, the focusing process and the following steps (steps S3-S7) are performed again.

When it is determined that xy cross-sectional images have been obtained for all of the focal lengths (YES in step S7), the microscope 100 generates scan control data (step S9) and ends the process of generating scan control data. In this example, the microscope 100 first generates three-dimensional-image data of the sample for each focal length from a plurality of pieces of xy cross-sectional-image data each generated for a certain focal length of the varifocal lens 5. According to the three-dimensional-image data generated for each focal length and information on the sample for calibration, the microscope 100 then locates the deviation of a scan position that has been caused by the varifocal lens 5. The microscope 100 finally generates scan control data to correct the located deviation of the scan position, and stores this scan control data in the storage unit 15. The flowchart depicted in FIG. 2 is intended to obtain scan control data for one wavelength, but scan control data may be obtained for each wavelength used for an observation. Scan control data may be generated by the control unit 14.

With reference to factors that could lead to deviation of a scan position (error in lateral magnification, distortion, center-position deviation, and field curvature), the following describes in detail a method of generating scan control data for correcting the deviation of a scan position by referring to FIGS. 3-7.

Figure 3:
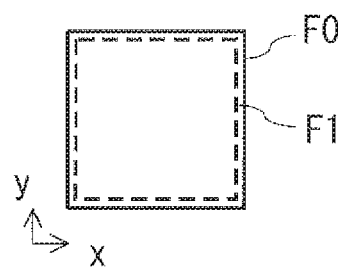
FIG. 3 illustrates a method of correcting a lateral magnification.

FIG. 3 illustrates a method of correcting a lateral magnification. FIG. 3 depicts a change in scan range caused by an error in lateral magnification. As depicted in FIG. 3, when an error is caused in the lateral magnification, a scan range F1, which is a scan range in an xy direction that is included in three-dimensional-image data, is enlarged or reduced (in this example, reduced) relative to a scan range F0, which is a scan range in the xy direction that is scanned in the absence of an error. Accordingly, when the scan range is reduced due to the varifocal lens 5, the microscope 100 may generate scan control data to designate a scan range that is wider than a scan range that is designated in the absence of an error (e.g., scan range F0). When the scan range is enlarged due to the varifocal lens 5, the microscope 100 may generate scan control data to designate a scan range that is narrower than a scan range that is designated in the absence of an error (e.g., scan range F0).

FIG. 4A illustrates a method of correcting pincushion distortion. FIG. 4B illustrates a method of correcting barrel distortion. FIGS. 4A and 4B depict a change in scan range caused by distortion. As depicted in FIGS. 4A and 4B, when distortion occurs, the shape of a scan range in the xy direction that is included in three-dimensional-image data (scan range F2 or F3) becomes a scan range F0 vertically and laterally distorted, the scan range F0 being a scan range in the xy direction that is scanned in the absence of distortion. Hence, as the distance from the center of the scan range F2 (or scan range F3) increases, deviation of the scan position becomes greater; in particular, as the distance from the center of the scan range F2 (or scan range F3) increases in the x direction (y direction), deviation of the scan position in the x direction (y direction) becomes greater. Accordingly, when distortion occurs due to the varifocal lens 5, the microscope 100 may generate scan control data that designates a scan position obtained by making a correction in the xy direction more greatly, as the distance from the center of the scan range becomes greater, with respect to a scan position that is designated in the absence of the distortion.

FIG. 5 illustrates a method of correcting a center-position deviation of a scan range. FIG. 5 depicts a change in a scan range caused by deviation of the center position of the scan range. The center-position deviation of the scan range may occur when, for example, the optical-axis direction of the varifocal lens 5 changes due to a change in the focal length of the varifocal lens 5. As depicted in FIG. 5, when center-position deviation occurs, a scan range F4 in the xy direction that is included in three-dimensional-image data becomes a range obtained as a result of a shift (parallel displacement)

of a scan range F0 in the xy direction that is scanned in the absence of center-position deviation. The shift occurs in a direction in which the center position deviates and by a distance by which the center position is deviated. Accordingly, when center-position deviation occurs due to the varifocal lens 5, the microscope 100 may generate scan control data for designating a scan range obtained by shifting a scan range that is designated in the absence of center-position deviation in a direction opposite to the direction of the deviation and by the same distance as the deviation.

FIG. 6 illustrates an optical system in which a scanner SC is located at a pupil conjugate position of an objective OB formed by a relay lens RL. In such an optical system, changing the oscillation angle of the scanner SC (angle formed by the reflection surface of the scanner SC and an optical axis) changes the angle of a principal ray incident on a pupil position of the objective OB. The objective OB converts this angle change into a change in a focused-on position of the light (scan position) in the xy direction, so that the focused-on position of the light can be changed by changing the oscillation angle of the scanner SC. FIG. 6 depicts an example in which a scan position has been moved from position P1 to position P2 by changing the oscillation angle of the scanner SC.

The optical system of the microscope 100 functions in the same manner as the optical system depicted in FIG. 6, and hence changing the oscillation angle of the scanner 3 in the microscope 100 can change a scan position in the xy direction. The factors described above with reference to FIGS. 3-5 (error in lateral magnification, distortion, and center-position deviation) and their combinations all lead to deviation of a scan position in the xy direction that is caused by the varifocal lens 5. Accordingly, when the varifocal lens 5 has caused an error in lateral magnification, distortion, or center-position deviation and thus has deviated a scan position, the microscope 100 may correct the deviation of the scan position simply via the control unit 14 controlling the scanner 3 according to scan control data. In this situation, for all of the factors above, the scan control data is intended to control the scanner 3. In particular, the scan control data is intended to control the scanner 3 in accordance with the focal length of the varifocal lens 5, e.g., is intended to designate an oscillation angle for the scanner 3 for each of target xyz coordinates. That is, the control unit 14 controls the scanner 3 in accordance with the focal length of the varifocal lens 5, thereby allowing the microscope 100 to correct deviation of a scan position that is caused by the varifocal lens 5.

Figure 7A:
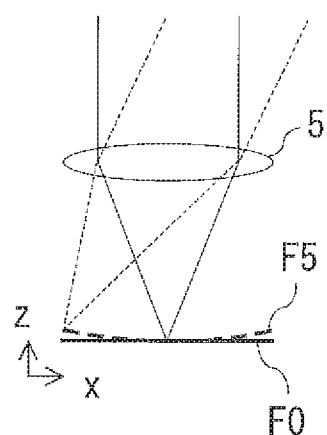
FIG. 7A illustrates a method of correcting a field curvature, where the field curvature has not been corrected yet.
Figure 7B:
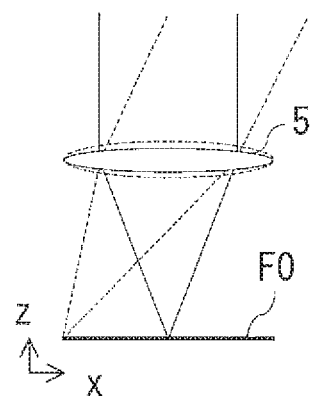
FIG. 7B illustrates a method of correcting a field curvature, where the field curvature has been corrected.

FIGS. 7A and 7B illustrate a method of correcting a field curvature, and a change in a scan range that is caused by the field curvature. FIG. 7A depicts a state before correction of the field curvature. FIG. 7B depicts a state after correction of the field curvature. The optical system between the varifocal lens 5 and a sample (relay lens 6, mirror 7, and objective 8) is not illustrated in FIGS. 7A and 7B. As depicted in FIG. 7A, when a field curvature occurs, a scan range F5 included in three-dimensional data is warped in a z direction, and hence the z coordinate of a scan position close to the center of a scan range becomes different from the z coordinate of a scan position distant from the center. Accordingly, when the field curvature occurs due to the varifocal lens 5, the microscope 100 may generate scan control data that designates a scan position obtained by making a correction in the z direction more greatly, as the distance from the center of the scan range becomes greater, with respect to a scan position that is designated in the absence of distortion.

As depicted in FIG. 7B, the z coordinate of the scan position may be changed by changing the lens shape so as to change the focal length of the varifocal lens 5. A field curvature causes a scan position to deviate in the z direction due to the varifocal lens 5. Hence, when the varifocal lens 5 causes a field curvature and thus deviates a scan position, the microscope 100 may correct the deviation of the scan position via the control unit 14 simply controlling the varifocal lens 5 according to scan control data. In this situation, the scan control data is intended to control the varifocal lens 5. In particular, the scan control data is intended to control the varifocal lens 5 in accordance with a focal length calculated for the varifocal lens 5 from a target z coordinate (information on a scan position) and an oscillation angle calculated for the scanner 3 from target xy coordinates (information on the scan position). For example, the scan control data may be intended to designate a focal length for the varifocal lens 5 for each of the target xyz coordinates. That is, the control unit 14 controls the varifocal lens 5 in accordance with a focal length calculated for the varifocal lens 5 from a target z coordinate and an oscillation angle calculated for the scanner 3 from target xy coordinates. This allows the microscope 100 to correct deviation of a scan position caused by the varifocal lens 5.

In the microscope 100, when the varifocal lens 5 deviates a scan position in both the xy direction and the z direction (e.g., when a field curvature and distortion occur), the control unit 14 controls the scanner 3 and the varifocal lens 5 according to scan control data. This may correct the deviation of the scan position. In this case, the scan control data includes data for controlling the scanner 3 in accordance with a focal length calculated for the varifocal lens 5 from a target z coordinate. The scan control data further includes data for controlling the varifocal lens 5 in accordance with the focal length calculated for the varifocal lens 5 from the target z coordinate and an oscillation angle calculated for the scanner 3 from target xy coordinates. The scan control data is intended to, for example, designate the oscillation angle of the scanner 3 and the focal length of the varifocal lens 5 for each of the target xyz coordinates. That is, the control unit 14 controls the scanner 3 in accordance with a focal length calculated for the varifocal lens 5 from the target z coordinate, and controls the varifocal lens 5 in accordance with the focal length calculated for the varifocal lens 5 from the target z coordinate and an oscillation angle calculated for the scanner 3 from target xy coordinates. This allows the microscope 100 to correct deviation of a scan position caused by the varifocal lens 5. Deviation of a scan position is different for each wavelength used for an observation, and hence scan control data may be provided for each wavelength.

Figure 8:
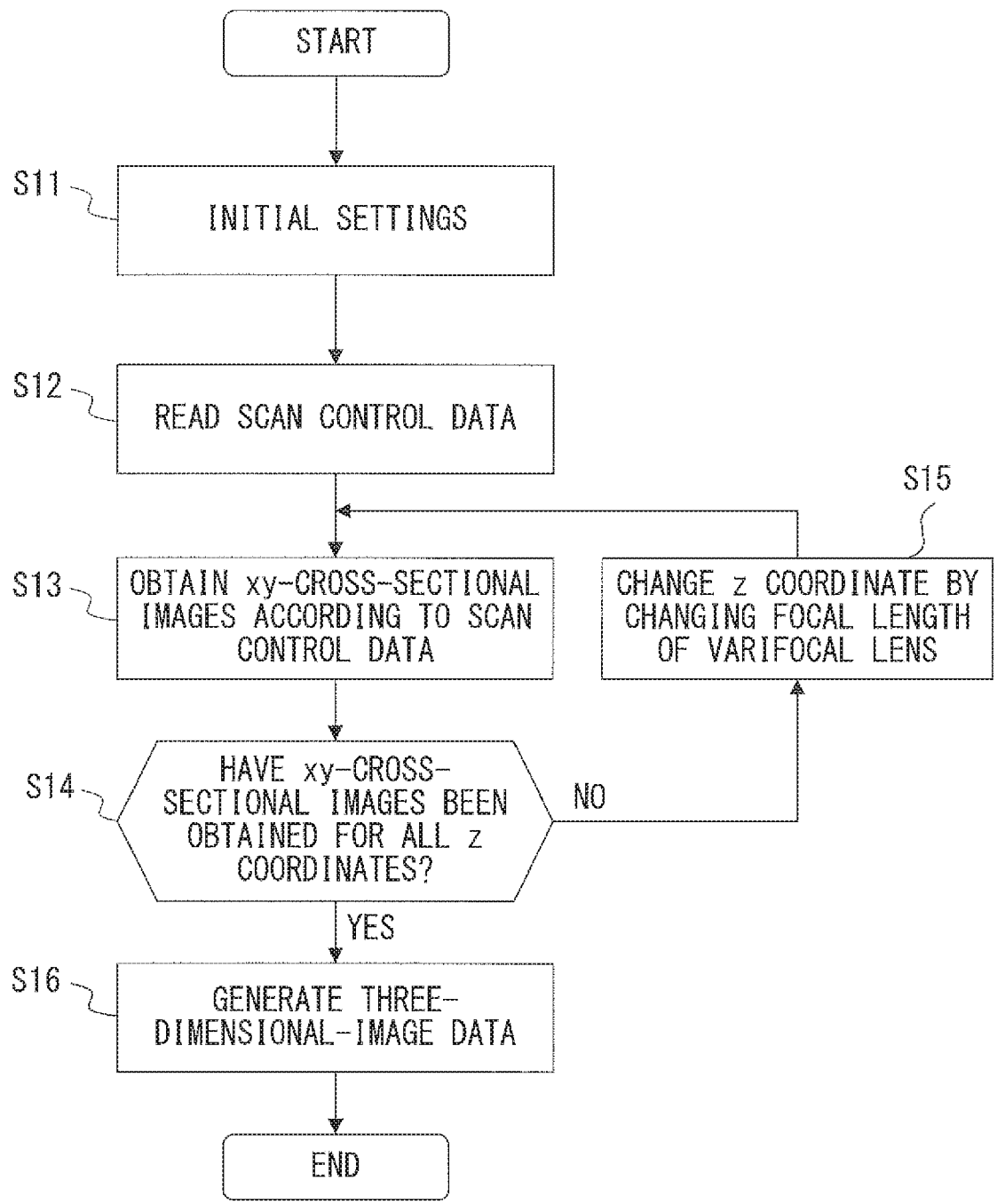
FIG. 8 is a flowchart of a process of generating three-dimensional-image data performed by a microscope 100 in accordance with embodiment 1.

FIG. 8 is a flowchart of a process of generating three-dimensional-image data performed by the microscope 100. With reference to FIG. 8, the following specifically describes a method of generating three-dimensional-image data using scan control data. The three-dimensional-image-data generating process depicted in FIG. 8 starts after a user has put a lens in focus on a sample S placed on the stage 9 with the focal length of the varifocal lens 5 adjusted in a manner such that a parallel light flux enters the objective 8.

The microscope 100 makes initial settings (step S11). In this example, the microscope 100 designates information such as an objective to be used, scan ranges (a scan range in the xy direction and a scan range in the z direction), and intervals between z coordinates at which xy cross-sectional images are to be obtained (hereinafter referred to as z intervals). These pieces of information may be input to the microscope 100 by the user, or may be read from a setting file stored in advance in the storage unit 15.

The microscope 100 reads scan control data (step S12). In this example, the control unit 14 reads apiece of scan control data corresponding to the objective to be used (objective 8, in this example) from scan control data stored in the storage unit 15 for each objective.

After reading scan control data, the microscope 100 obtains xy cross-sectional images according to the read scan control data (step S13). In this example, when the varifocal lens 5 has caused deviation of a scan position in the xy direction, the control unit 14 controls the scanner 3 according to the scan control data that depends on the objective 8. When the varifocal lens 5 has caused deviation of a scan position in the xy direction and the z direction, the control unit 14 controls the scanner 3 and the varifocal lens 5 according to the scan control data that depends on the objective 8. Consequently, xy cross-sectional images are obtained, and xy-cross-sectional-image data is generated.

The microscope 100 determines whether xy cross-sectional images have been obtained for all z coordinates (step S14). In this example, the microscope 100 determines, for example, whether scans have been performed completely at the z intervals within the scan range in the z direction that has been designated in step S11.

When it is determined that all images have not been obtained (NO in step S14), the microscope 100 changes the z coordinate by changing the focal length of the varifocal lens 5 (step S15). In this example, the control unit 14 changes the focal length of the varifocal lens 5 in such a manner as to change the z coordinate of the scan position by the length of one z interval. Then, the obtaining process (step S13) and determining process (step S14) on xy cross-sectional images are performed again.

When it is determined that all images have been obtained (YES in step S14), the microscope 100 generates three-dimensional-image data (step S15) and ends the three-dimensional-image-data generating process. In this example, the microscope 100 generates three-dimensional-image data from pieces of data generated in step S13, i.e., a plurality of pieces of xy-cross-sectional-image data corresponding to different z coordinates. Although a piece of three-dimensional-image data is generated using one wavelength in the flowchart depicted in FIG. 8, a piece of three-dimensional-image data may be generated for each wavelength used for an observation so as to generate a piece of multicolored three-dimensional-image data by mixing pieces of generated three-dimensional-image data. Three-dimensional-image data may be generated by controlling the varifocal lens and the scanner according to color aberration information of the optical system in such a manner that an identical three-dimensional-image position is achieved for various wavelengths.

Embodiment 2

Figure 9:
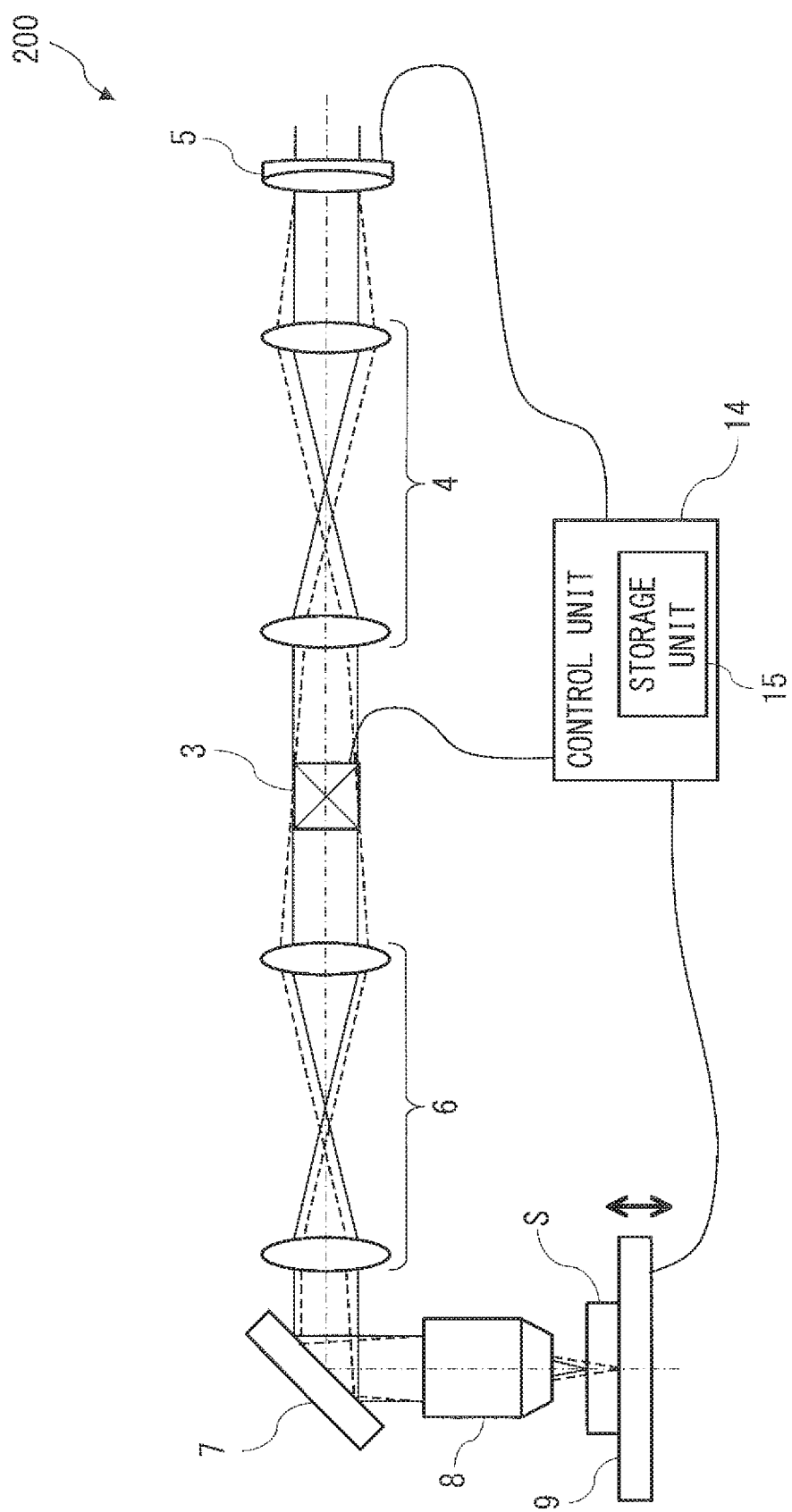
FIG. 9 illustrates the configuration of a microscope 200 in accordance with embodiment 2.

FIG. 9 illustrates the configuration of a microscope 200 in accordance with the present embodiment. The microscope 200 is a confocal laser scanning microscope. The microscope 200 is similar to the microscope 100 except for a difference in order in which the scanner 3 and the varifocal lens 5 are arranged. As with the microscope 100 in accordance with embodiment 1, the microscope 200 can quickly obtain an accurate three-dimensional image by scanning a sample S according to scan control data.

Embodiment 3

Figure 10:
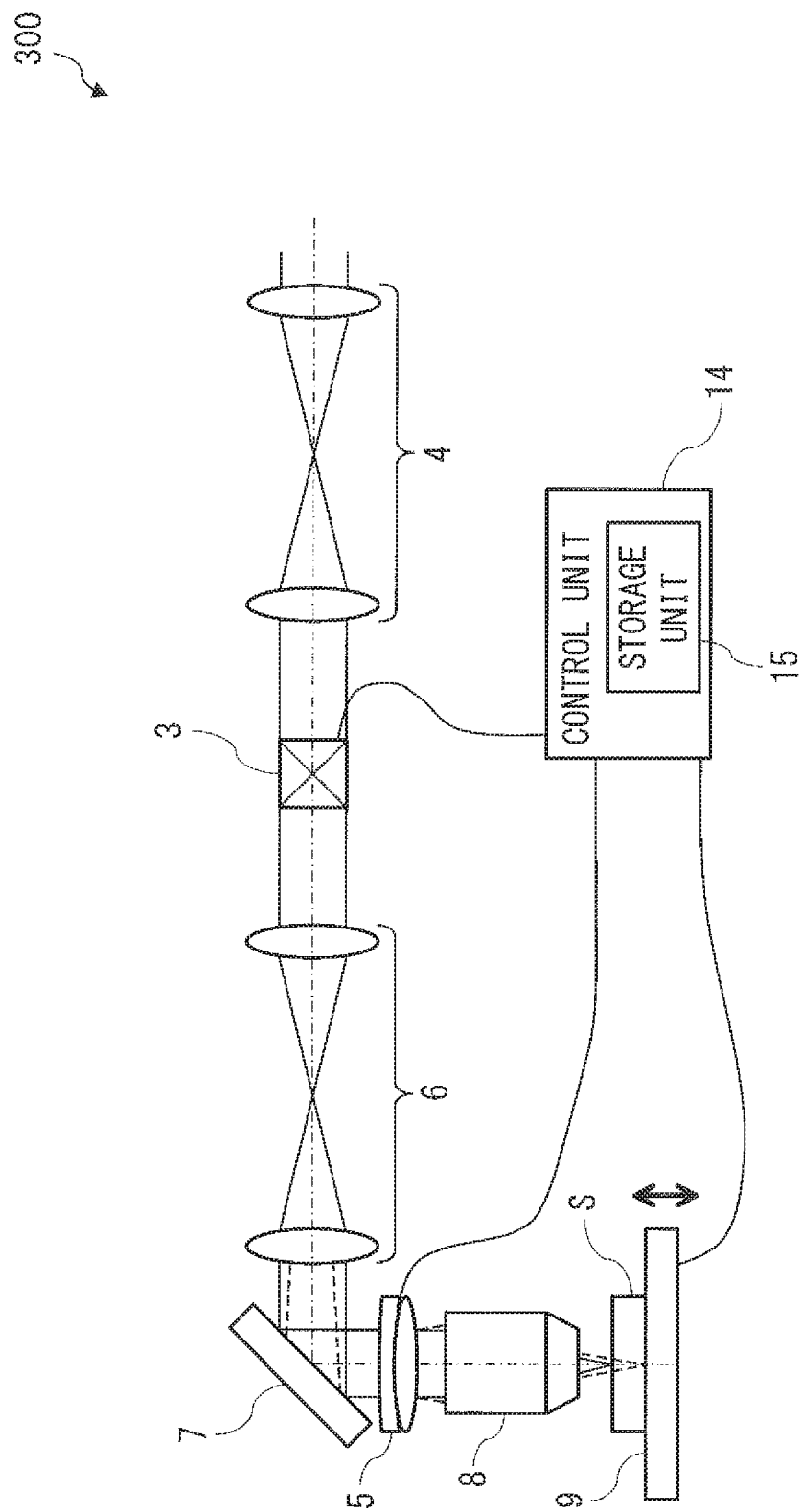
FIG. 10 illustrates the configuration of a microscope 300 in accordance with embodiment 3.

FIG. 10 illustrates the configuration of a microscope 300 in accordance with the present embodiment. The microscope 300 is a confocal laser scanning microscope. The microscope 300 is similar to the microscope 200 except for the fact that, in the microscope 300, the varifocal lens 5 is located at, or near, a pupil position of the objective 8. As with the microscopes in accordance with embodiments 1 and 2, the microscope 300 can quickly obtain an accurate three-dimensional image by scanning a sample S according to scan control data. This configuration may be used when the pupil position of the objective 8 is located outside the objective 8.

Embodiment 4

Figure 11:
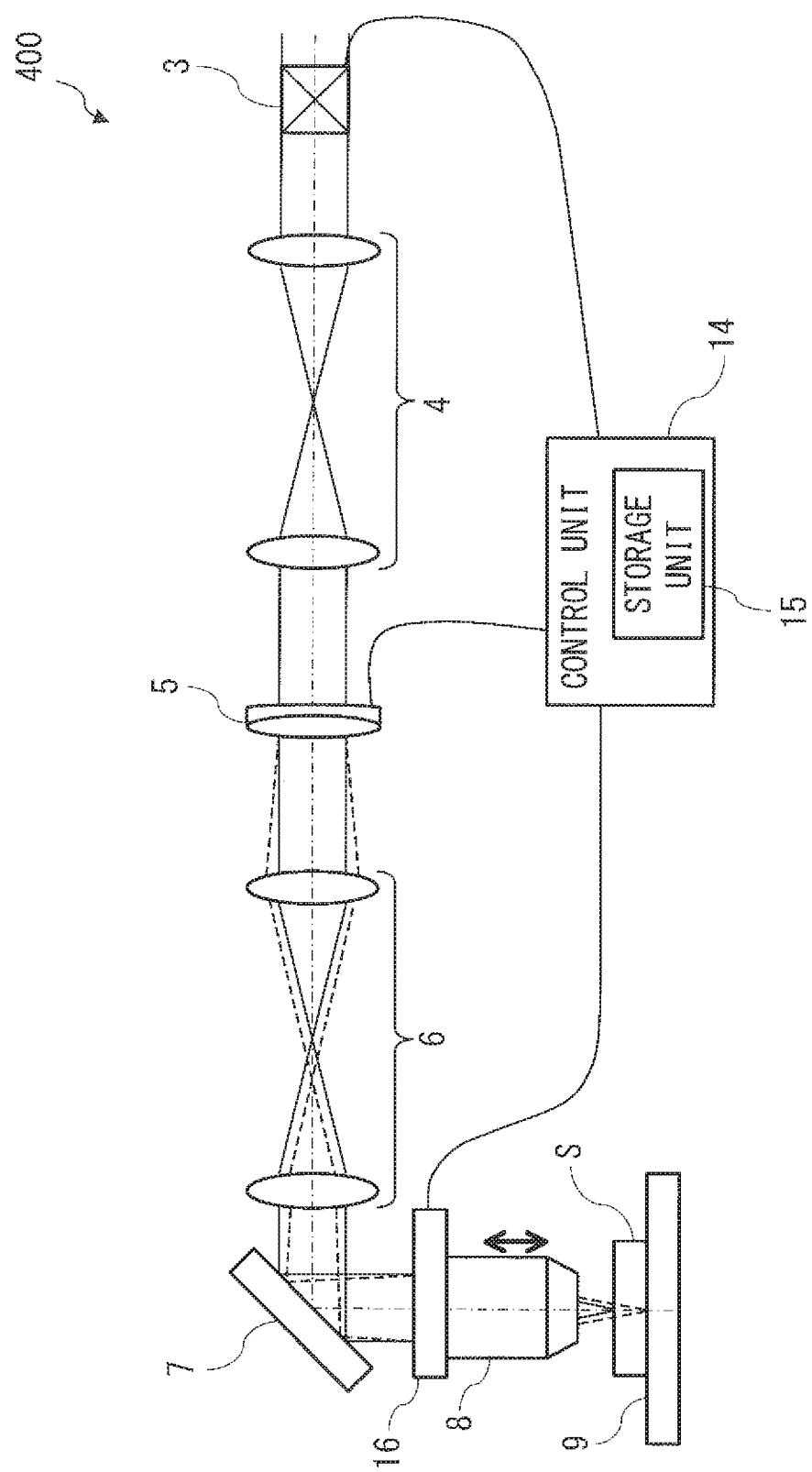
FIG. 11 illustrates the configuration of a microscope 400 in accordance with embodiment 4.

FIG. 11 illustrates the configuration of a microscope 400 in accordance with the present embodiment. The microscope 400 is a confocal laser scanning microscope. The microscope 400 is different from the microscope 100 in the sense that the microscope 400 includes an actuator 16 that moves the objective 8 in an optical-axis direction. The microscope 400 may change a distance between a sample S and the objective 8 via the control unit 14 causing the actuator 16 to move the objective 8. For the other features, the microscope 400 is similar to the microscope 100. As with the microscopes in accordance with embodiments 1-3, the microscope 400 can quickly obtain an accurate three-dimensional image by scanning a sample S according to scan control data.

In the microscope 400, moving the objective 8 changes a position relationship between a pupil conjugate position of the objective 8 and the varifocal lens 5. Hence, deviation of a scan position caused by the varifocal lens 5 may change with the position of the objective 8. In consideration of this fact, scan control data may be stored in the storage unit 15 for each objective position. The control unit 14 may control the scanner 3 or both the scanner 3 and the varifocal lens 5 according to scan control data that depends on an objective position. When the varifocal lens 5 has been displaced greatly from the pupil conjugate position of the objective 8 due to movement of the objective 8, deviation of a scan position may become too large to be adjusted using the varifocal lens 5. The storage unit 15 may additionally store offset data for offsetting a scan position in the z direction that is used in such a situation.

Embodiment 5

Figure 12:
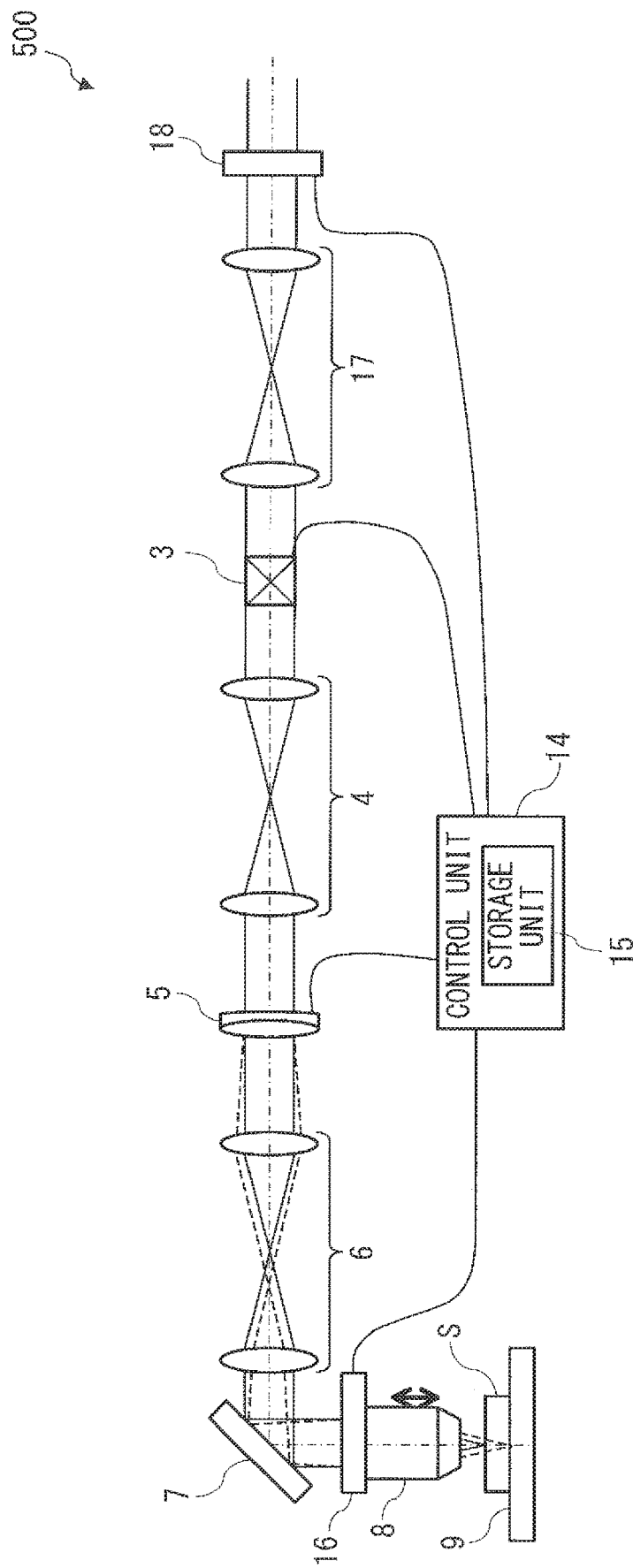
FIG. 12 illustrates the configuration of a microscope 500 in accordance with embodiment 5.

FIG. 12 illustrates the configuration of a microscope 500 in accordance with the present embodiment. The microscope 500 is a confocal laser scanning microscope. The microscope 500 is different from the microscope 400 in the sense that the microscope 500 includes a relay lens 17 and a wavefront modulator 18 between the scanner 3 and the dichroic mirror 2. The relay lens 17 projects the wavefront modulator 18 onto the scanner 3. The wavefront modulator 18 is a wavefront aberration correcting apparatus for correcting a wavefront aberration, and is located at a pupil conjugate position of an objective.

As with the microscopes in accordance with embodiments 1-4, the microscope 500 can quickly obtain an accurate three-dimensional image by scanning a sample S according to scan control data. In the microscope 500, the wavefront modulator 18 can correct an aberration that cannot be corrected by the scanner 3 and the varifocal lens 5 (e.g., spherical aberration). This allows a more accurate three-dimensional image to be obtained.

FIG. 12 depicts the wavefront modulator 18, which is a transmission-type modulator, but a reflection-type wavefront modulator, e.g., an LCOS or a deformable mirror, may be used. In FIG. 12, the wavefront modulator 18 is located between the scanner 3 and the dichroic mirror 2 (not illustrated). However, the wavefront modulator 18 only needs to be located at a pupil conjugate position of the objective 8.

The described embodiments indicate specific examples for facilitating understanding of the invention, and embodiments of the invention are not limited to them. Various modifications and changes can be made to the scanning microscopes without departing from the invention defined in the claims. A single embodiment may be achieved by combining some features from contexts of individual embodiments described herein.

The described embodiments are based on an exemplary situation in which the microscope is a confocal laser scanning microscope. However, as long as the microscope is a scanning microscope, it may be, for example, a multiphoton-excitation laser scanning microscope. The light source is not limited to a laser, and the scanning microscope may include a non-laser light source, e.g., a super luminescent diode (SLD) or a mercury lamp.

The described embodiments are based on an exemplary situation in which the storage unit 15 stores scan control data for each objective, but the storage unit 15 may store scan control data for each objective and for each light flux diameter of laser light emitted from the beam expander 19. An aberration caused by an objective changes with the light flux diameter of laser light that enters a pupil of the objective. Hence, use of such scan control data may correct not only deviation of a scan position caused by the varifocal lens but also deviation of the scan position caused by a change in aberration made by the objective.

What is claimed is:

1. A scanning microscope comprising:
    a laser configured to emit laser light;
    an objective configured to focus the laser light on an object;
    a scanner configured to scan the object in a direction orthogonal to an optical axis of the objective;
    a varifocal lens configured to scan the object in an optical-axis direction of the objective by changing a lens shape of the varifocal lens;
    a first relay lens;
    a second relay lens;
    a photodetector configured to detect fluorescence generated from the object upon the laser light being focused on the object by the objective; and
    a dichroic mirror configured to separate the fluorescence and the laser light emitted from the laser from each other,
    wherein:
    the varifocal lens is located at a position optically conjugate to a pupil of the objective and between the objective and the scanner,
    the first relay lens is located between the scanner and the varifocal lens, and
    the second relay lens is located between the pupil of the objective and the varifocal lens.

2. The scanning microscope according to claim 1, wherein the dichroic mirror is located between the varifocal lens and the laser.

3. The scanning microscope according to claim 2, further comprising:
    a confocal pinhole located at a position between the dichroic mirror and the photodetector, the position being optically conjugate to a front focal position of the objective,
    wherein the dichroic mirror is located between the scanner and the laser.

4. The scanning microscope according to claim 1, wherein:
    the scanner is located at a position optically conjugate to the pupil of the objective.

5. The scanning microscope according to claim 2, wherein:
    the scanner is located at a position optically conjugate to the pupil of the objective.

6. The scanning microscope according to claim 3, wherein:
    the scanner is located at a position optically conjugate to the pupil of the objective.

* * * * *